UNITED STATES PATENT OFFICE.

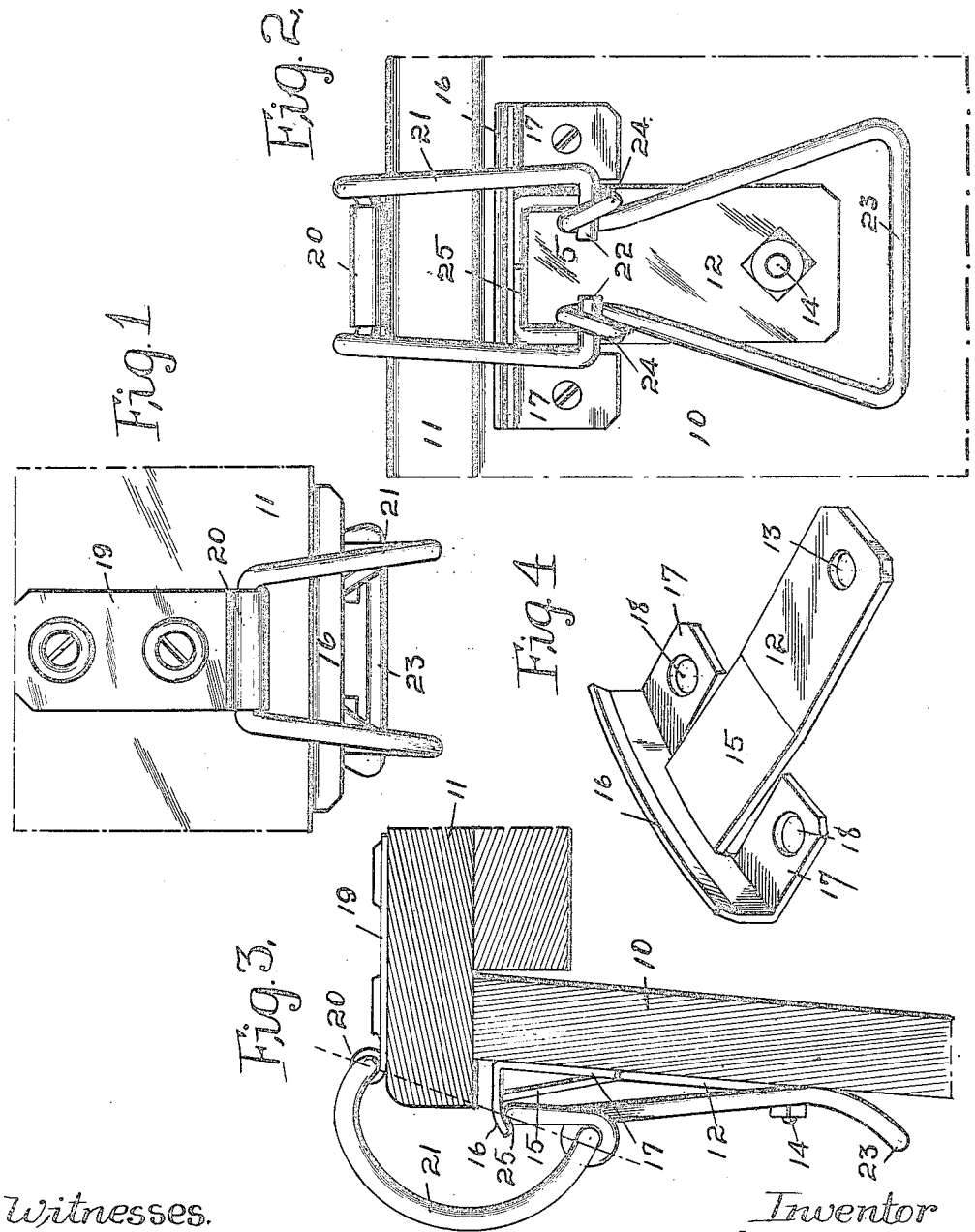

EDWARD L. WATROUS, OF DES MOINES, IOWA, ASSIGNOR TO DAVID B. GANN, OF CHICAGO, ILLINOIS.

BOX-FASTENER.

1,042,511.   Specification of Letters Patent.   Patented Oct. 29, 1912.

Application filed May 3, 1909. Serial No. 493,580.

*To all whom it may concern:*

Be it known that I, EDWARD L. WATROUS, a citizen of the United States, residing at Des Moines, in the county of Polk and State of Iowa, have invented a new and useful Box-Fastener, of which the following is a specification.

The object of my invention is to provide a fastener of simple, durable and inexpensive construction, especially designed for use in securing hinged doors to the body portions of machines, such for instance as washing machines, said fastener, however, being susceptible of use in connecting any hinged member with a stationary one.

More specifically it is my object to provide a fastener of this kind in which the entire fastener is constructed complete of sheet metal and spring wire, and which is so arranged that when the device is in its latched position, the operator may grasp the handle thereof, and by drawing it upwardly, he may release the latch and also elevate the hinged member, and when it is desired to close the latch, the operator need only grasp the handle and move it downwardly, and then inwardly, to thereby firmly and securely connect the hinged member with the stationary one.

My invention consists in the construction, arrangement and combination of the various parts of the device, whereby the objects contemplated are attained, as hereinafter more fully set forth, pointed out in my claims and illustrated in the accompanying drawings in which—

Figure 1 shows a top or plan view of a fastener embodying my invention applied to a hinged member. Fig. 2 shows a front elevation of same. Fig. 3 shows a side view of same, the hinged member and the stationary member to which the fastener is applied being shown in section, and Fig. 4 shows a detail perspective view of the keeper designed to be secured to the stationary member.

Referring to the accompanying drawings, I have used the reference numeral 10 to indicate a stationary member and 11 a hinged member to which the several parts of my improved fastener are applied.

The part that is designed to be attached to the stationary member is formed complete of a single piece of sheet metal made of resilient material, such as steel. It comprises a flat body portion 12 having a bolt opening 13 therein, designed to receive a bolt 14, or other fastening device.

At one end of the part 12 is an extension 15 arranged at an acute angle relative to the part 12, and at the end of the part 15 is a head 16. This head 16 extends transversely of the parts 12 and 15, and is arranged substantially at right angles to the end of the part 15. It is also concave in shape from the point where it unites with the part 15, to the outer edge thereof, as clearly shown in Fig. 3.

At the ends of the part 16 are two flat lugs 17 provided with screw openings 18.
These are arranged at the inner edge of the head 16.

For convenience in description, and assuming that the parts are in the positions shown in Fig. 3, the part 12 is arranged substantially vertically, the part 15 extends upwardly and outwardly from it, and the transverse head 16 extends horizontally outward from the side of the stationary member 10, and its outer end, beyond the part 15, curves downwardly, the lug 17 being flat against the side of the stationary member 10.

The part of the fastener that is attached to the hinged member 11 comprises a flat plate 19, having a cylindrical loop 20 formed in one end. This cylindrical loop 20 is designed to receive a link. Said link is formed complete of a single piece of spring wire, and its central portion is mounted in said loop 20, and its sides are curved or bowed outwardly and downwardly, as shown in Fig. 3, and its ends extended straight inwardly toward each other. The said sides are indicated by the numeral 21, and the ends by the numeral 22. The other member is formed complete of a single piece of spring wire, and comprises a handle 23 formed in the central portion of the wire. Said handle is also provided with two integral loops 24 designed to receive the ends 22, and to thus pivotally connect the handle member with the link member.

Beyond the loops 24, the wire of the handle member is extended in line with the handle member in the opposite direction from the handle, and the ends thereof extend inwardly toward each other at 25. The outer end of the handle is curved outwardly, as clearly shown in Fig. 3, so that when it is in engagement with the stationary member 10, an operator may easily insert his fingers between the handle and the member 10, to thereby conveniently grasp the handle. The parts of the handle and link are so arranged and proportioned relative to the stationary keeper, that when the latch is in its closed position, as shown in Fig. 3, the pivot point of the handle member and link will be inside of a line drawn through the pivot point of the link, and the point where the handle member engages the part 15, as shown by the dotted lines in Fig. 3. Hence, the hinged member will be firmly held to the stationary member, and on account of the curvature in the sides of the link, the hinged member will be yieldingly held to the stationary member. Furthermore, in the event that there should be any variation in the thickness of the hinged member, or if for any reason the hinged member were prevented from lying flat upon and close to the stationary member, such variations would not interfere with the closing of the fastener, because of the curvature in the spring link.

In practical use, and assuming the fastener to be in the position shown in Fig. 3, then if it is desired to open the hinged member, the operator simply grasps the handle and pulls it outwardly and upwardly. The first effect of this will be to move the pivot point of the handle and link past the dead center line shown by dotted lines in Fig. 3, to thereby release the fastener, and the next effect will be to raise the hinged member so that the fastener proper forms a convenient handle for raising and lowering the hinged member.

In closing the fastener, the operator also grasps the handle and moves it downwardly in such position that the ends 25 of the handle member will first strike upon the inclined portion 15. This will serve as a guide to cause the ends 25 to engage the head 16 adjacent to the part 15, and the operation is completed by forcing the handle end inwardly toward the stationary member 10 and past the dead center line.

It is obvious that the device is of very simple and inexpensive construction, and may be made of sheet metal and wire, which may all be manufactured by means of dies and formers, and without hand work.

I claim as my invention:

1. An improved fastener comprising a member designed to be connected to a movable part, said member consisting of a plate having a loop therein, a link formed of a single piece of spring wire with its central portion pivoted to said loop, and its sides curved and its ends projected toward each other, and a handle member pivoted to said ends and having an extension projected beyond the point where the link is connected to the handle, in a direction away from the handle, and a member designed to be connected to a stationary part and having a head designed to be engaged by the extension on the handle.

2. An improved fastener comprising a member designed to be connected to a movable part and consisting of a link, means for pivotally connecting it to the movable part, and a handle member formed complete of a single piece of wire and having its central portion formed into a handle and also having loops formed in its sides designed to be pivotally connected with said link, and having its ends extended beyond the loops away from the handle, and then toward each other, and a keeper designed to be secured to a stationary part and having a head to be engaged by the extension end of the handle member.

3. An improved fastener comprising a member designed to be connected to a movable part and consisting of a link, means for pivotally connecting it to the movable part, and a handle member formed complete of a single piece of wire and having its central portion formed into a handle and also having loops formed in its sides, designed to be pivotally connected with said link and having its ends extended beyond the loops away from the handle, and then toward each other, the sides of the handle between the loops and the handle end being curved, and a keeper designed to be secured to a stationary part and having a head to be engaged by the extension end of the handle member.

4. In a latch, a member designed to be secured to a stationary part, said member being formed complete of a single piece of sheet metal and comprising a flat body portion, a part extended at an acute angle relative to the body portion, a transverse head extended substantially at right angles to the said flat portion, and having its outer portion curved in a direction toward the said flat body portion, and a latch member designed to be connected to a moving part and comprising a link pivoted to the moving part, and a handle member pivoted to the link, the latter being designed to co-act with the member to be connected to a stationary part.

5. In a latch, a member designed to be secured to a stationary part, said member being formed complete of a single piece of sheet metal and comprising a flat body portion, a part extended at an acute angle relative to the body portion, a transverse head extended substantially at right angles to the said flat portion, and having its outer portion curved in a direction toward the said flat body portion, and lugs formed at the end portions of said head and extended in a direction toward the said flat body portion and being arranged in substantially the same plane, and a latch member designed to be connected to a moving part and comprising a link pivoted to the moving part, and a handle member pivoted to the link, the latter being designed to co-act with the member to be connected to a stationary part.

Des Moines, Iowa, November 28, 1908.

EDWARD L. WATROUS.

Witnesses:
 MILDRED B. GOLDIZEN,
 NELLIE M. TAYLOR.